(12) United States Patent
Rozema et al.

(10) Patent No.: US 7,438,244 B1
(45) Date of Patent: Oct. 21, 2008

(54) METHOD AND APPARATUS FOR SEPARATION AND RECYCLING PLASTIC

(75) Inventors: Timothy C. Rozema, West Olive, MI (US); James W. Trent, Holland, MI (US)

(73) Assignee: Environ Solutions Incorproated, Ankeny, IA (US)

( * ) Notice: Subject to any disclaimer, the term of this patent is extended or adjusted under 35 U.S.C. 154(b) by 154 days.

(21) Appl. No.: 11/416,552

(22) Filed: May 3, 2006

(51) Int. Cl.
*B02C 23/20* (2006.01)
(52) U.S. Cl. ............... 241/19; 241/23; 241/24.18; 241/65; 241/79.1; 241/101.8
(58) Field of Classification Search ............ 241/19, 241/29, 24.18, 60, 79.1, 101.8, 101.2, 65, 241/24.19, 23; 209/3
See application file for complete search history.

(56) References Cited

U.S. PATENT DOCUMENTS

| | | |
|---|---|---|
| 5,084,135 A | 1/1992 | Brooks et al. |
| 5,110,055 A | 5/1992 | Teeny |
| 5,174,316 A | 12/1992 | Keller et al. |
| 5,255,859 A | 10/1993 | Peacock et al. |
| 5,277,758 A | 1/1994 | Brooks et al. |
| 5,335,786 A | 8/1994 | Roberto |
| 5,540,244 A | 7/1996 | Brooks et al. |
| 5,908,165 A | 6/1999 | Guschall et al. |
| 6,149,012 A | 11/2000 | Brooks et al. |

*Primary Examiner*—Mark Rosenbaum
(74) *Attorney, Agent, or Firm*—G. Brian Pingel; Camille L. Urban

(57) ABSTRACT

An apparatus and method for separating contaminated plastic material from various types of contaminants, including paper, includes a grinder for reducing the size of the contaminated plastic material to a reduced size of pieces and an eductor for receiving the pieces of contaminated plastic material from the grinder. The eductor has a nozzle portion at one end for producing a turbulent flow of compressed air and an intermediate portion with a mixing chamber for receiving the turbulent flow of air and the reduced size of pieces whereby the pieces are pulled into the eductor by the compressed air flow and the contaminants are separated from the plastic.

11 Claims, 5 Drawing Sheets

METHOD AND APPARATUS FOR SEPARATION AND RECYCLING PLASTIC

BACKGROUND OF THE INVENTION

1. Field of the Invention

The present invention relates in general to an apparatus and method for recovering plastic from commingled plastic and paper fiber waste and other contaminants, and more specifically is directed to a method and apparatus involving the application of a turbulent flow of air against the contaminated plastic to provide separation.

2. Description of the Prior Art

With the wide use of plastic materials, such as polyethylene, that are used in conjunction with a variety of different types of paper fibers or other contaminants, a large amount of commingled plastic and fiber waste is produced on an annual basis throughout the world. Such waste materials include agricultural film, material from paper recycling plants and post consumer plastic such as grocery and garbage bags.

The separation of contaminants from such plastic materials is often difficult because the materials are contaminated with types of fibers that are similar in size and weight to the plastic sought to be reclaimed. Thus, a number of apparatus and methods have been developed for the reclamation of plastic from such materials. For example, see U.S. Pat. No. 6,149,012 issued to Brooks, et al.; U.S. Pat. No. 5,255,859 issued to Peacock, et al.; U.S. Pat. No. 5,540,244 issued to Brooks, et al.; U.S. Pat. No. 5,277,758 issued to Brooks, et al.; U.S. Pat. No. 5,110,055 issued to Teeny; U.S. Pat. No. 5,084,135 issued to Brooks, et al.; U.S. Pat. No. 5,174,316 issued to Keller, et al.; U.S. Pat. No. 5,908,165 issued to Guschall, et al. and U.S. Pat. No. 5,335,786 issued to Roberto.

One of the most common methods of reclaiming plastic that has been contaminated with fibers is through the use of a water tank in which the contaminated plastic is placed. Because paper fibers readily absorb water they tend to sink in the tanks whereas the polyethylene plastic scrap will float and can be skimmed from the top. However, such water tank processes suffer from the disadvantage of relatively high operating costs necessitated by the use of the water tanks and the time involved in performing them.

U.S. Pat. No. 6,149,012 issued to Brooks, et al. has recognized these difficulties and provides a dry system and method for cleaning and recovering plastic from coated fiber poly waste. The system and method disclosed in such patent involves the use of shredding, screening, magnetic separation and cyclone separation equipment in combination with densification and agglomeration of the plastic/paper material. Although such system seems to be an improvement from the use of water separation tanks, the efficiency of the disclosed system and method appears to be less than desired. Accordingly, the present invention was designed as an improvement over the above described prior art systems to provide an efficient and effective method and apparatus for the removal of contaminants from plastic material.

SUMMARY OF THE INVENTION

The present invention provides an apparatus and method for separating plastic material from various types of contaminants, including paper. The apparatus and method of the present invention involves the use of a grinding means for reducing the size of the contaminated plastic material to a reduced size of pieces and an eductor means for receiving said pieces of contaminated plastic material from the grinding means.

The eductor means is formed with a nozzle portion at one end having a first inlet portion for receiving compressed air and an outlet port that has an outlet orifice for producing a turbulent flow of compressed air downstream of the outlet orifice. The eductor further includes an intermediate portion having a mixing chamber for receiving said flow of turbulent air from said outlet orifice and a second inlet port for receiving said contaminated plastic pieces, whereby said pieces are pulled into said eductor by the turbulent air flow and said contaminants are separated from said plastic material.

The foregoing and other advantages of the present invention will appear from the following description. In the description, reference is made to the accompanying drawings, which form a part hereof, and in which there is shown by illustration and not of limitation a specific apparatus and method in which the invention may be embodied. Such embodiment does not represent the full scope of the invention, but rather the invention may be employed in a variety of other embodiments and reference is made to the claims herein for interpreting the breadth of the invention.

BRIEF DESCRIPTION OF THE DRAWINGS

The system and method of the invention is further described an explained in relation to the following drawings wherein.

DETAILED DESCRIPTION OF THE PREFERRED EMBODIMENT

A preferred embodiment of the present invention is illustrated in FIGS. 1-5 and provides a method and apparatus for separating plastic material from various types of contaminants, including paper.

Figure 1:
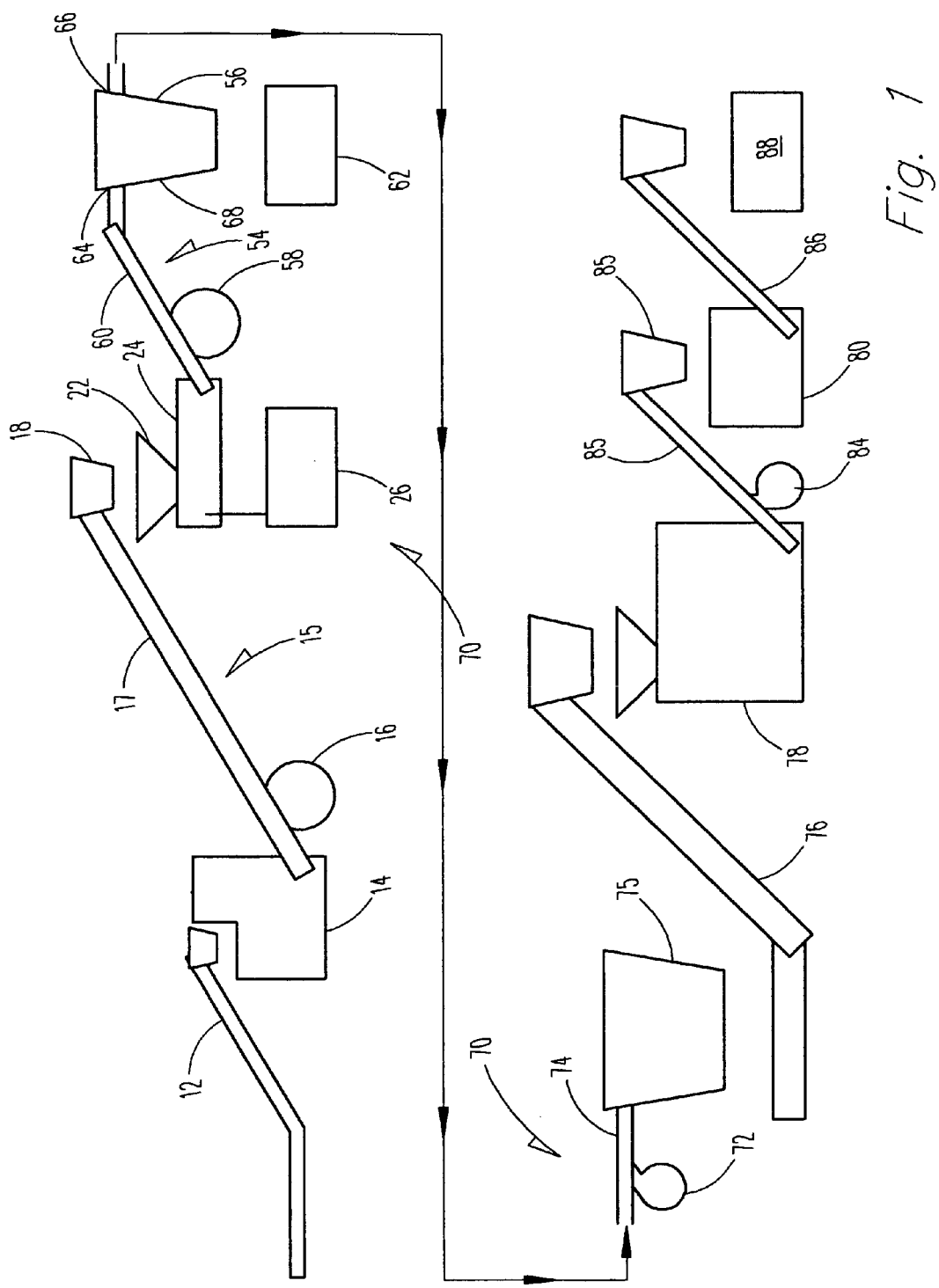
FIG. 1 depicts in simplified diagrammatic form a preferred embodiment of the apparatus and method of the present invention.

Referring first to FIG. 1, a simplified diagrammatic view of the preferred embodiment of the apparatus is shown generally at 10 in FIG. 1. The apparatus 10 is designed to clean/purify contaminated plastic material such as preferably agricultural film, waste material from paper recycling plants and post consumer plastics such as grocery and garbage bags. Such material is typically clumpy with individual pieces having widely differing sizes.

As indicated in FIG. 1, the apparatus 10 begins with a belt conveyor 12 upon which the contaminated plastic material is placed for delivery to, preferably, a wet grinder 14 to reduce the input material to a consistent particle size and eliminate clumping. The use of the wet grinder 14, in the apparatus 10, such as a Nelmar 40 horsepower wet grinder, is advantageous due to the high inherent moisture found in the majority of the contaminated plastic material. However, dryer raw materials most likely could be processed with the use of less expensive grinding equipment such as a low speed shredder or dry grinding system in place of the wet grinder 14. Also, various types of screens can be used in the grinder 14, but testing of the apparatus 10 has established that the use of a two inch screen generally seems to yield the best results for the contaminated plastic material tested and results in reducing the size of such material to approximately two inch square pieces.

After processing of the contaminated plastic material by the grinder 14, the reduced size pieces are directed by a first transport means 15 to a terminal cyclone 18. The means 15 is formed of a blower 16 and an eight inch round air duct 17 that leads to the cyclone 18. The terminal cyclone 18 is cone shaped and is designed to reduce the velocity of the airflow provided by the blower 16. Preferably the blower 16 is a Sterling Systems 7.5 horsepower rated at 1,750 cubic feet per minute at 6,548 feet per minute.

The terminal cyclone 18 has a 46 inch diameter round cone rated for 2,181 cubic feet per minute input. Thus, the contaminated plastic pieces fall out the bottom of the cyclone 18 due to gravity while the airstream from the blower 16 primarily escapes through the top of the cyclone 18.

The cyclone 18 empties into a 20 inch hopper 22 that feeds a separation means in the form of a 6 inch eductor 24 that is preferably produced by Vortex Ventures and is shown in detail in FIGS. 2-5. The eductor 24 utilizes compressed air from a compressor 26 to create a vacuum that acts to suck the contaminated plastic pieces from the hopper 22. To obtain highly efficient purification of the contaminated plastic pieces, it is critical for the eductor 24 to be formed in such fashion so as to provide an environment in which such plastic pieces are subjected to a violent environment in which turbulence, pressure change and airflow separate surface contamination from the pieces. Thus, it is highly important for optimum operation of the apparatus 10 that the eductor 24 is formed similar to the type of eductor described and shown in U.S. Pat. No. 5,664,733, issued Sep. 9, 1997 and incorporated herein by reference.

Figure 2:
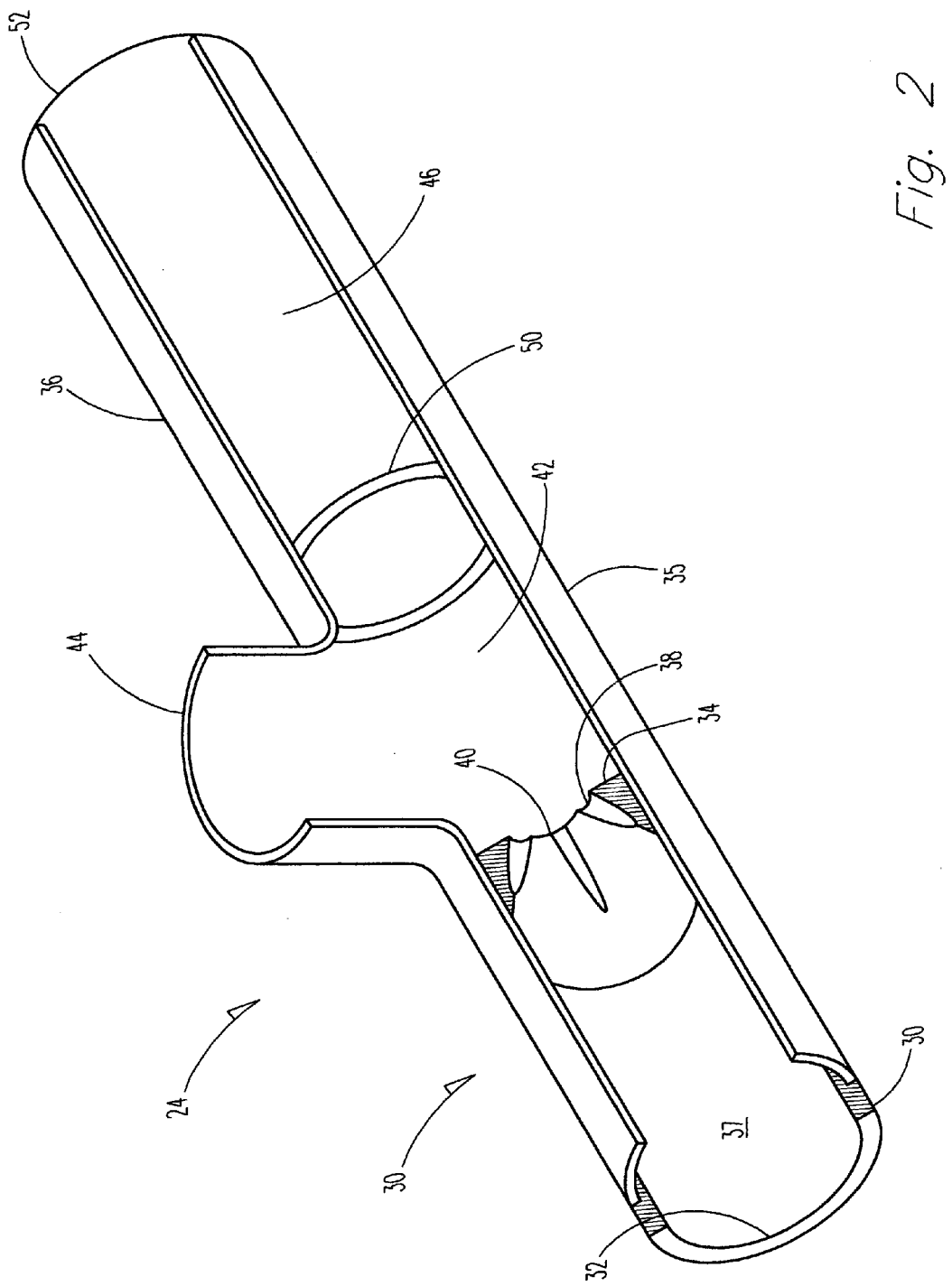
FIG. 2 is a partial cross-sectional perspective view of an eductor that is included in the apparatus of FIG. 1.
Figure 3:
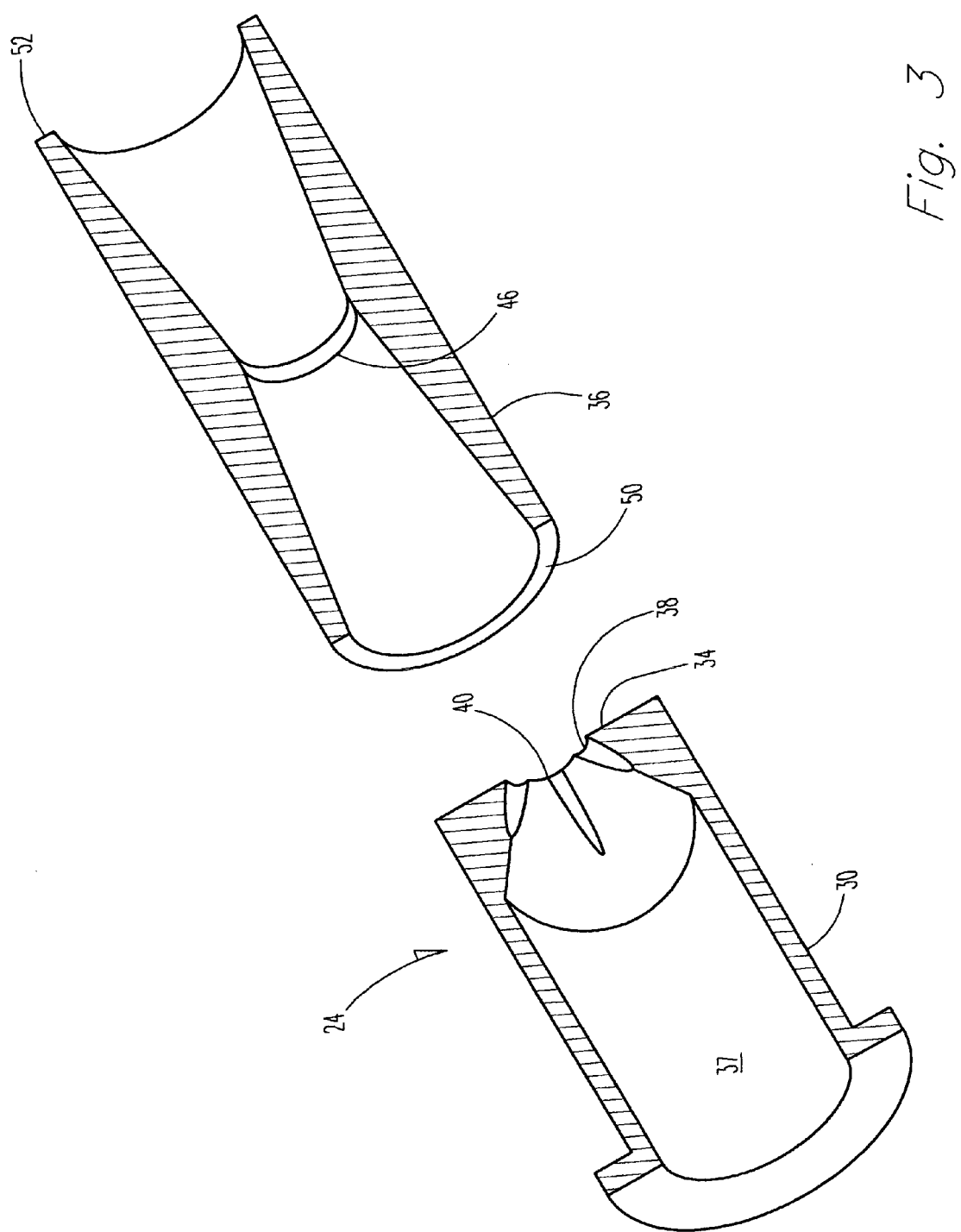
FIG. 3 is a partial cross-sectional perspective view of a nozzle and diffuser included in the eductor of FIG. 2.
Figure 4:
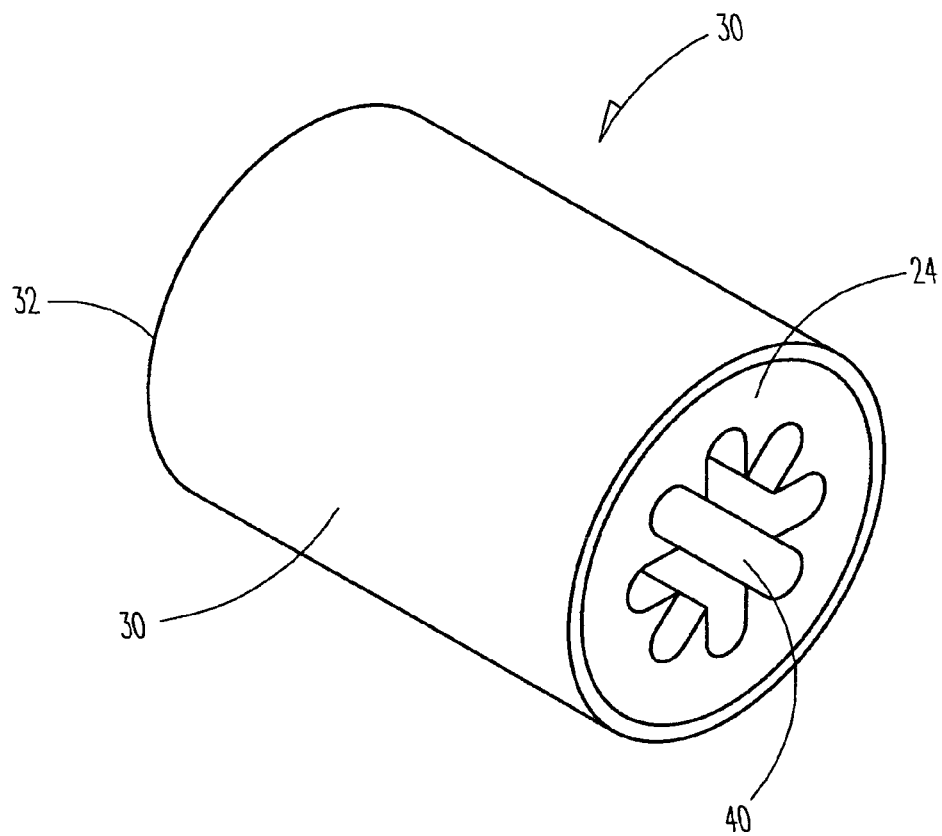
FIG. 4 is a rear perspective view of the nozzle of FIG. 3.
Figure 5:
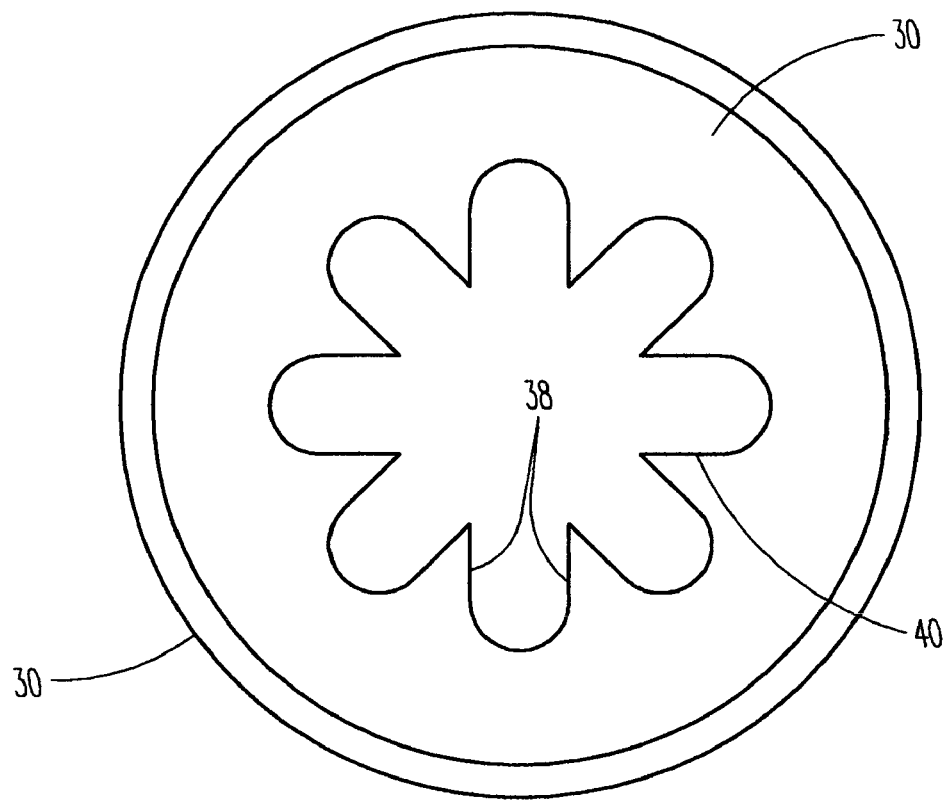
FIG. 5 is an outlet end elevational view of the nozzle shown in FIG. 4.

Referring now to both FIGS. 2 and 3, the eductor 24 is formed with a nozzle portion 30 at one end, an intermediate portion 35 (shown only in FIG. 2) and an outlet portion 36. The nozzle portion 30 has a first inlet port 32 and an outlet port 34 and is generally cylindrically shaped with a cavity 37 extending between the ports 32 and 34 to form a passageway therethrough. To provide for acceleration of airflow through the nozzle portion 30, the nozzle inlet port 32 has a greater cross-sectional area than that of the outlet port 34. Also, the nozzle outlet port 34 has a substantially circular center portion 38, as best shown in FIGS. 3-5 and a plurality of protrusions 40 extending outwardly from the perimeter of the center portion 38.

Preferably the nozzle outlet port 34 has six or more of the protrusions 40 that are generally equally spaced about the perimeter of the center portion 38 and are designed to create a chaotic turbulent, accelerated flow of air downstream of the nozzle 30. This accelerated airflow is supplied to the intermediate portion 35 that is formed with a mixing area 42 and a medial inlet 44 that is associated with the hopper 22 into which the contaminated plastic material is supplied. Due to the speed of the air flow exiting the nozzle 30 the contaminated plastic pieces in the hopper 22 are sucked into the eductor 24 via the inlet 44. By the use of the nozzle 30, the eductor 24 provides for mixing of the accelerated compressed air from the compressor 26 with the contaminated plastic material entering the medial inlet 44 immediately downstream of the nozzle 30 in the mixing area 42. In this way, the contaminated plastic material entering the eductor 24 is subjected to the turbulent environment in the mixing area 42 to separate the contaminants from the plastic pieces.

The outlet portion 36 of the eductor 24 preferably has a containment structure in the form of a diffuser 46 with an inlet end 50 and an outlet end 52 for the purpose of pressure recovery. The portion 36 preferably is formed with the inlet end 52 having a smaller cross-sectional area than the outlet end 52, as indicated in FIGS. 2 and 3. Although the type of eductor described in U.S. Pat. No. 6,664,733 is noted for its fluid mixing capabilities, Applicants have found that it provides a highly efficient instrument for separation purposes. Thus, the eductor 24 provides an industrially acceptable plastic that is created from previously "landfill only" waste.

The paper fiber contaminated plastic processed by the apparatus 10 typically had an 8-15 percent paper fiber contamination before wet grinding. However, after the processing by the eductor 24, the surface contamination of the plastic material was reduced to 0-4 to four percent. It was also found that during the processing by the eductor 24, the separated paper fibers from the contaminated plastic material tended to form tiny balls and thereby easily fell out during separation after leaving the eductor 24.

The particular eductor 24 used in the apparatus 10 is rated for up to 100 psi at 350 cfm airflow, but it has been found that the contamination separation from the plastic material is effective at levels as low as 30 psi. It should be noted, however, that 60 to 75 psi proved optimal for continuous production. Although only a 6 inch eductor 24 is used for the preferred embodiment, it should be known to those skilled in the art that larger eductors are available and may operate equally effectively, but would require commensurately greater airflow to work effectively. The air compressor 26 is preferably a 100 hp Ingersol Rand Compressor. The compressor 26 provides a high pressure airflow in the eductor 24 of from 30 to 100 psi at 250 to 350 cfm. It is this violent environment provided by the eductor 24 that separates surface attached impurities such as paper fiber, dirt or organic matter from the plastic material.

The separated plastic material and contaminants that flow out of the eductor 24 are carried by a second air stream transport means 54 to a separation cyclone 56 that acts as a velocity breaker. The transport means 54 is formed of a blower 58 that it is preferably a Sterling System 10 hp 2,000 cfm at 5,730 fm blower and an 8 inch circular ducting 60.

The separation cyclone 56 preferably is a 41 inch diameter cyclone with top and bottom cones so that it allows higher specific gravity material to fall out of the flow while the desired lower specific gravity plastic remains suspended therein. The cyclone 56 includes an air inlet 64 and air outlet 66 that are both located at the top portion of the cyclone 58 which allows gravitationally pulled waste material to fall out a small conical bottom outlet end 68 to be received by a waste container 62 and discarded. Such waste material consists primarily of paper, heavy plastic such as bottle caps and some metals.

A third transport means 70 formed by a blower 72 and air duct 74 is interposed between the separation cyclone 58 and a cone shaped terminal cyclone 75 for the purpose of drawing the separated plastic material from the cyclone 56 and boosting airflow after the cyclone 56 to keep a constant flow rate. Preferably, the blower 72 has a 10 hp, 2,000 cfm, 5,730 fm rating and the duct 74 is again an 8 inch circular ducting.

The now clean plastic material flows from the cyclone 56 via the transport means 70 to the terminal cyclone 75. The purpose of the cyclone 75 is to reduce the velocity of the airflow provided by the third transport means 70 so that the plastic material therein fall out of the airstream out the bottom of the cyclone 75 and onto an elevator 76 that carries the plastic material to a densifier 78.

Densifiers are commonly used in the plastics industry to reduce volumes of light and/or fluffy material. Thus, the separated plastic material that is supplied to the densifier 78 is in the form of 2 inch square pieces. Such material is reduced in the densifier 78 to a granular substance that looks somewhat like kitty litter. The densifier 78 that is preferable for use in the apparatus 10 has been found to be a Cal-Sierra Machine 400 hp system that uses a 400 hp motor to spin large lawn-mower-like blades inside a 100 gallon garbage can-like container.

Friction from the blades congeals the plastic material into a near molten state that is rapidly cooled by water as it leaves the densification chamber of the densifier 78. Rapid cooling crystallizes the molten stream of plastic material into a granular material suitable for use by the plastics molding industry. However, to make the processed plastic material more acceptable, it is helpful for the apparatus 10 to further include a grinder 80 to insure a maximum particle size and cool the end material. The congealed plastic material is pulled from the densifier 78 preferably by a 5 horsepower blower 84 to supply the material via a circular duct 85 to another terminal cyclone 84 that provides the plastic material to the grinder 80. The resulting ground plastic material from the grinder 80 is moved by an auger system 86 to a finished product container 88. If desired, such finished product material may further be pelletized to create a more uniform product typical of virgin plastic resin.

Thus, as has been described above, the present invention provides a highly efficient apparatus and method for separating plastic materials from contaminants. Although the apparatus and method of the present invention has been described with respect to a preferred embodiment, it should be understood that such embodiment may be altered without avoiding the true spirit and scope of the present invention. For example, a variety of different types of individual components of the apparatus 10, such as the blowers and cyclones, may be substituted for those described herein and it is known in the art that there are a variety of densifiers that may also be employed in the present invention. Also, as previously described the use of a wet grinder is not essential as other grinding methods may be employed.

What is claimed is:

1. An apparatus for separating plastic material from various types of contaminants, including paper, said apparatus comprising:
    (a) grinding means for reducing the size of said contaminated plastic material to a reduced size of pieces;
    (b) mixing means for receiving said pieces of contaminated plastic material from said grinding means, said mixing means comprising;
        (1) a nozzle portion at one end having a first inlet port for receiving compressed air and an outlet port that has an outlet orifice for producing a turbulent flow of compressed air downstream of said orifice;
        (2) an intermediate portion having a mixing chamber for receiving said flow of turbulent air from said outlet orifice and a second inlet port for receiving said contaminated plastic pieces whereby said pieces are pulled into said mixing means by said turbulent air flow and said contaminants are separated from said pieces to produce essentially a mixture of uncontaminated plastic pieces and contaminants;
        (3) an outlet end through which said separated contaminants and said plastic pieces exit the mixing means;
    (c) air compression means for supplying compressed air to said mixing means; and;
    (d) means for removing said separated contaminants from said plastic pieces 2. The apparatus as described in claim 1, wherein said nozzle outlet orifice has a generally circular center portion and at least one protrusion that extends outwardly from the perimeter of said central portion.

3. The apparatus for separating plastic material as described in claim 2, wherein said nozzle outlet orifice has a plurality of said outwardly extending protrusions.

4. An apparatus for separating plastic material that is contaminated with various types of contaminants, including paper, said apparatus comprising:
    (a) Grinding means for reducing the size of said contaminated plastic material to a reduced size of pieces;
    (b) Mixing means in the form of an eductor having a nozzle portion for receiving said contaminated plastic pieces from said grinding means and subjecting said pieces to a turbulent flow of air such that said contaminants are separated from said contaminated plastic pieces to produce essentially uncontaminated plastic pieces;
    (c) Separation means in the form of a separation cyclone for receiving a mixture of said separated contaminants and said plastic pieces and for removing said separated contaminants from said mixture; and
    (d) Densifier means for initially heating said plastic pieces into a near molten state and then causing such pieces to form into a granular plastic material by cooling.

5. The apparatus for separating plastic material as described in claim 4, wherein said apparatus further includes transport means between said grinder and said mixing means and between said mixing means and said separation means, said transport means each comprising a blower and a conduit.

6. The apparatus for separating plastic material as described in claim 5, wherein said apparatus further includes air compressor means for supplying compressed air to said mixing means.

7. The apparatus for separating plastic material as described in claim 6, wherein said mixing means includes a nozzle portion at one end having a first inlet port for receiving compressed air from said compressor means and an outlet port that has an outlet orifice for producing a turbulent flow of compressed air downstream of said orifice.

8. The apparatus for separating plastic material as described in claim 6, wherein said mixing means further includes an intermediate portion having a mixing chamber for receiving said flow of turbulent air from said outlet orifice and a second inlet port for receiving said contaminated plastic pieces from said grinder, whereby said pieces are pulled into said mixing means by said turbulent airflow and said contaminants are separated from said pieces to produce essentially a mixture of uncontaminated plastic pieces and contaminants.

9. A method for separating plastic material from various types of contaminants, including paper, said method comprising:
    (a) Supplying said contaminated plastic material to a grinding means for reducing the size of said material to a reduced size of pieces;
    (b) Transporting said pieces to a mixing means in the form of an eductor that includes a mixing chamber for receiving said contaminated pieces;
    (c) subjecting said pieces to a turbulent flow of air in said mixing means to separate said contaminants from said pieces to produce essentially a mixture of uncontaminated plastic pieces and contaminants; and
    (d) Transporting said mixture of uncontaminated plastic pieces and contaminants to a separation cyclone for removing said contaminants from said mixture.

10. The method for separating plastic material as described in claim 9, wherein said method further includes the step of supplying said uncontaminated plastic pieces to a densifier means to form said plastic pieces into a granular shape.

11. The method for separating plastic material as described in claim 10, wherein said densifier initially congeals said plastic pieces into a near molten state and then rapidly cools said pieces to cause them to crystallize into said granular form.

* * * * *